(12) United States Patent
Fujiki et al.

(10) Patent No.: US 9,704,006 B2
(45) Date of Patent: Jul. 11, 2017

(54) IMAGE PROCESSING APPARATUS

(71) Applicant: KYOCERA Document Solutions Inc.

(72) Inventors: Atsushi Fujiki, Osaka (JP); Kunihiko Shimamoto, Osaka (JP); Yuya Tagami, Osaka (JP)

(73) Assignee: Kyocera Document Solutions, Inc. (JP)

(*) Notice: Subject to any disclaimer, the term of this patent is extended or adjusted under 35 U.S.C. 154(b) by 130 days.

(21) Appl. No.: 14/605,080

(22) Filed: Jan. 26, 2015

(65) Prior Publication Data

US 2015/0213322 A1 Jul. 30, 2015

(30) Foreign Application Priority Data

Jan. 29, 2014 (JP) .................. 2014-014935

(51) Int. Cl.
  *G06K 7/10* (2006.01)
  *G06F 3/12* (2006.01)
  *G06K 1/12* (2006.01)

(52) U.S. Cl.
  CPC ........... *G06K 7/10712* (2013.01); *G06F 3/12* (2013.01); *G06K 1/121* (2013.01); *G06K 2007/10504* (2013.01)

(58) Field of Classification Search
  CPC ....... H04N 2201/3269; H04N 1/32133; H04N 1/32149; H04N 1/32352; G06K 19/06037; G06K 7/10722; G06K 7/1443; G06K 7/10821; G06K 7/1447; G06K 7/1404; G06K 7/1417; G06K 19/06103; G06K 7/10712
  See application file for complete search history.

(56) References Cited

U.S. PATENT DOCUMENTS

| | | | | |
|---|---|---|---|---|
| 5,726,435 A | * | 3/1998 | Hara | G06K 7/14 235/462.09 |
| 5,798,513 A | * | 8/1998 | Ackley | G06K 7/10722 235/462.15 |
| 6,457,651 B2 | * | 10/2002 | Paul | G06K 19/06028 235/375 |
| 8,550,351 B2 | * | 10/2013 | Sun | G06K 7/14 235/462.1 |
| 9,111,186 B2 | * | 8/2015 | Blasinski | G06K 19/0614 |
| 2007/0114285 A1 | * | 5/2007 | Chang | G06K 7/1417 235/462.1 |
| 2012/0273563 A1 | * | 11/2012 | Shimamoto | G06K 7/1456 235/375 |

FOREIGN PATENT DOCUMENTS

| | | |
|---|---|---|
| JP | 2007-206904 | 8/2007 |
| JP | 2009-261014 | 11/2009 |
| JP | 2009-055582 | 12/2009 |
| JP | 2010-129048 | 6/2010 |

* cited by examiner

*Primary Examiner* — Jingge Wu (57) ABSTRACT

An image processing apparatus includes a 2D code detecting unit, a 2D code decoding unit, and an invalidation processing unit. The 2D code detecting unit is configured to detect a 2D code in a document image. The 2D code decoding unit is configured to try to decode the detected 2D code. The invalidation processing unit is configured to perform invalidation of the 2D code so as to make this 2D code undetectable by the 2D code detecting unit if the 2D code decoding unit failed to decode the 2D code.

1 Claim, 7 Drawing Sheets

DETECTION DIRECTION

DETECTION DIRECTION

DETECTION DIRECTION

141

IMAGE PROCESSING APPARATUS

CROSS-REFERENCE TO RELATED APPLICATIONS

This application relates to and claims priority rights from Japanese Patent Application No. 2014-014935, filed on Jan. 29, 2014, the entire disclosures of which are hereby incorporated by reference herein.

BACKGROUND

1. Field of the Present Disclosure

The present disclosure relates to an image processing apparatus.

2. Description of the Related Art

Recently, two-dimensional matrix barcodes are widely used, such as QR code (trademark). Hereinafter, "two-dimensional matrix barcode" is simply described as "2D code."

If a read 2D code is damaged and an error detection ratio thereof is equal to or larger than a predetermined value, an apparatus regenerates a 2D code from decoded information, and replaces the damaged 2D code with the regenerated 2D code.

Further, when copying, if a 2D code is damaged and can not be decoded, another apparatus notifies a user of it, and prints a copy of an original document without any changes on the original document.

However, in the aforementioned techniques, if a 2D code is detected but can not be properly decoded to original data due to damage of the 2D code, such a 2D code that is damaged and can not be decoded is printed on a printed matter.

Consequently, when reading the 2D code from the printed matter and trying to decode it, (a) meaningless processes such as detecting the 2D code and trying to decode it are performed even though the 2D code can not be decoded, or (b) the 2D code is decoded to wrong data rather than the original data.

SUMMARY

An image processing apparatus according to an aspect of the present disclosure includes a 2D code detecting unit, a 2D code decoding unit, and an invalidation processing unit. The 2D code detecting unit is configured to detect a 2D code in a document image. The 2D code decoding unit is configured to try to decode the detected 2D code. The invalidation processing unit is configured to perform invalidation of the 2D code so as to make this 2D code undetectable by the 2D code detecting unit if the 2D code decoding unit failed to decode the 2D code.

These and other objects, features and advantages of the present disclosure will become more apparent upon reading of the following detailed description along with the accompanied drawings.

DETAILED DESCRIPTION

Hereinafter, embodiments according to aspects of the present disclosure will be explained with reference to drawings.

Embodiment 1

Figure 1:
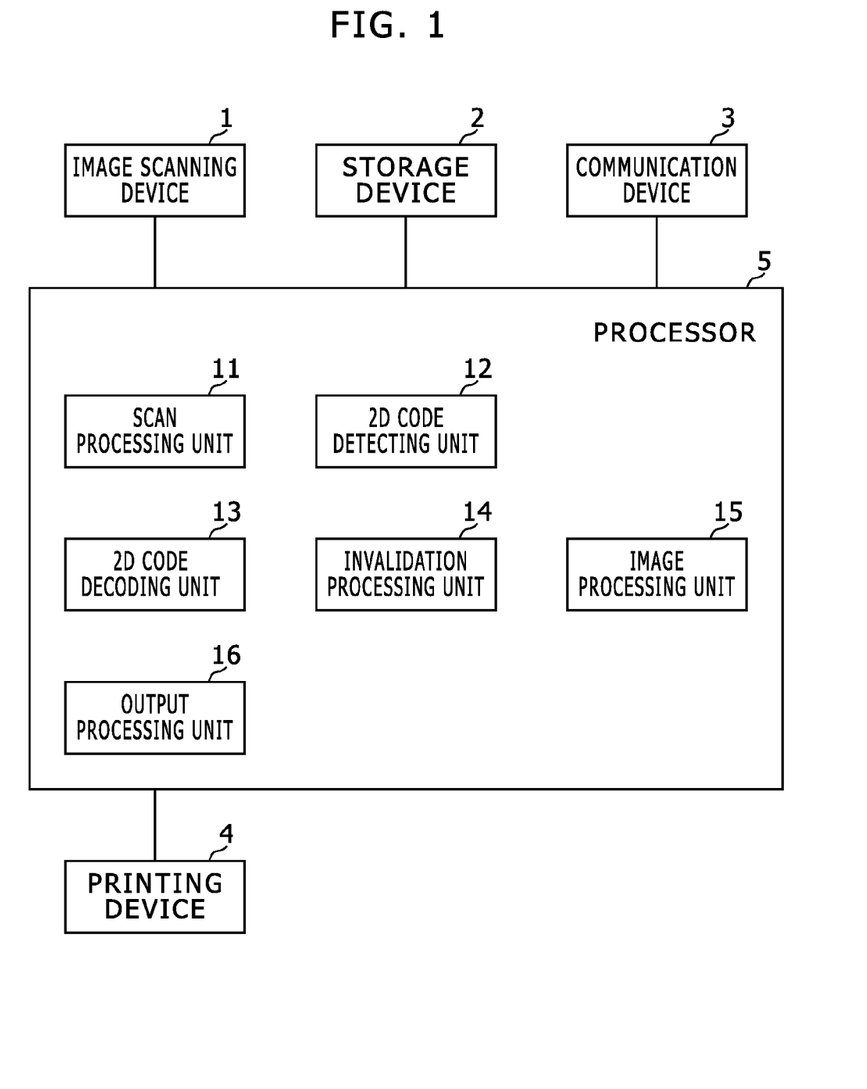
FIG. 1 shows a block diagram which indicates a configuration of an image processing apparatus according to an embodiment of the present disclosure.

FIG. 1 shows a block diagram which indicates a configuration of an image processing apparatus according to an embodiment of the present disclosure. This image processing apparatus includes an image scanning device 1, a storage device 2, a communication device 3, a printing device 4, and a processor 5.

The image scanning device 1 is an internal device that optically scans a document image of a document, and generates image data (RGB data, here) of the document image.

The storage device 2 is a device capable of storing data and programs. A non-volatile storage medium with a large capacity is used as the storage device 2, such as non-volatile memory or hard disk drive. The storage device 2 is enabled, for example, to store the image data of the document image.

The communicating device 3 is a device which performs data communication with an external device. A network interface which performs network communication, a modem which performs facsimile communication or the like is used as the communicating device 3.

The printing device 4 performs printing of a document image based on image data of the document image for which image processing such as color conversion and halftone process for printing has been processed.

The processor 5 is a computer which includes a CPU (Central Processing Unit), a ROM (Read Only Memory), and a RAM (Random Access Memory), loads a program from the ROM or the storage device 2 to the RAM, and executes the program with the CPU to embody various processing units. In this embodiment, the processor 5 embodies a scan processing unit 11, a 2D code detecting unit 12, a 2D code decoding unit 13, an invalidation processing unit 14, an image processing unit 15, and an output processing unit 16.

The scan processing unit 11 controls the image scanning device 1, acquires a document image, and stores image data of the document image in the storage device 2, the RAM, or the like.

The 2D code detecting unit 12 detects a 2D code (e.g. a QR code (registered trademark)) in the document image. In this embodiment, the 2D code detecting unit 12 detects a 2D code by detecting position detection patterns in the 2D code.

The 2D code decoding unit 13 tries to decode the 2D code detected by the 2D code detecting unit 12, and if the 2D code is successfully decoded, then generates decoded data.

If the 2D code is a QR code (registered trademark), the 2D code decoding unit 13 acquires version information and format information in the 2D code, reads coded data from the 2D code on the basis of the version information and format information, and decodes the coded data with error correction. Therefore, for example, if the data error detected when trying to decode the 2D code can not be corrected, then the 2D code decoding unit 13 determines that the decoding is failed.

If the 2D code decoding unit 13 failed to decode the 2D code, the invalidation processing unit 14 performs invalidation of the 2D code so as to make this 2D code undetectable by the 2D code detecting unit 12. In this embodiment, the invalidation processing unit 14 invalidates the position detection pattern in the 2D code in order to make the 2D code undetectable.

For the document image, the image processing unit 15 performs image processing necessary for printing such as color conversion (here, color conversion from RGB to CMYK) and halftone process (e.g. binarization process using an error diffusion method).

The output processing unit 16 causes the printing device 4 to perform printing of the document image on the basis of image data of the document image after the image processing.

In particular, if the invalidation processing unit 14 invalidated the 2D code in the document image, the output processing unit 16 causes the printing device 4 to perform printing of the document image on the basis of image data of the document image after the invalidation of the 2D code and the image processing.

Figure 2:
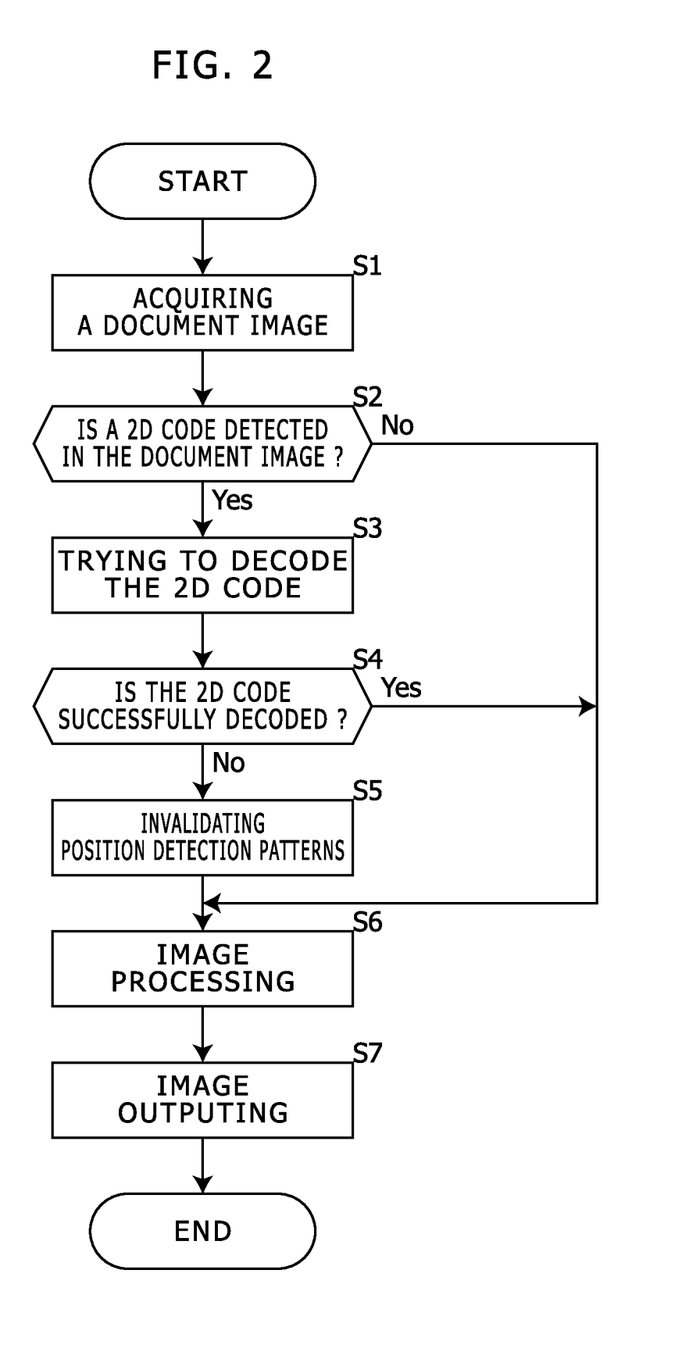
FIG. 2 shows a flowchart which explains a behavior of the image processing apparatus according to Embodiment 1.

The following part explains a behavior of the aforementioned image processing apparatus. FIG. 2 shows a flowchart which explains a behavior of the image processing apparatus according to Embodiment 1.

When a predetermined user operation is detected in an operation panel (not shown), the scan processing unit 11 controls the image scanning device 1, acquires a document image of a document set on the image scanning device 1, and stores image data of the document image in the storage device 2, the RAM, or the like (in Step S1).

The 2D code detecting unit 12 tries to detect a 2D code in the document image (in Step S2).

If a 2D code was detected in the document image, then the 2D code decoding unit 13 tries to decode the 2D code detected by the 2D code detecting unit 12 (in Step S3).

The invalidation processing unit 14 determines whether the 2D code decoding unit 13 successfully decoded the 2D code or not (in Step S4); and if the decoding of the 2D code was failed, the invalidation processing unit 14 invalidates the 2D code so as to make this 2D code undetectable by the 2D code detecting unit 12 (in Step S5).

In this embodiment, the invalidation processing unit 14 invalidates the position detection pattern in the 2D code in order to make the 2D code undetectable.

Figure 3:
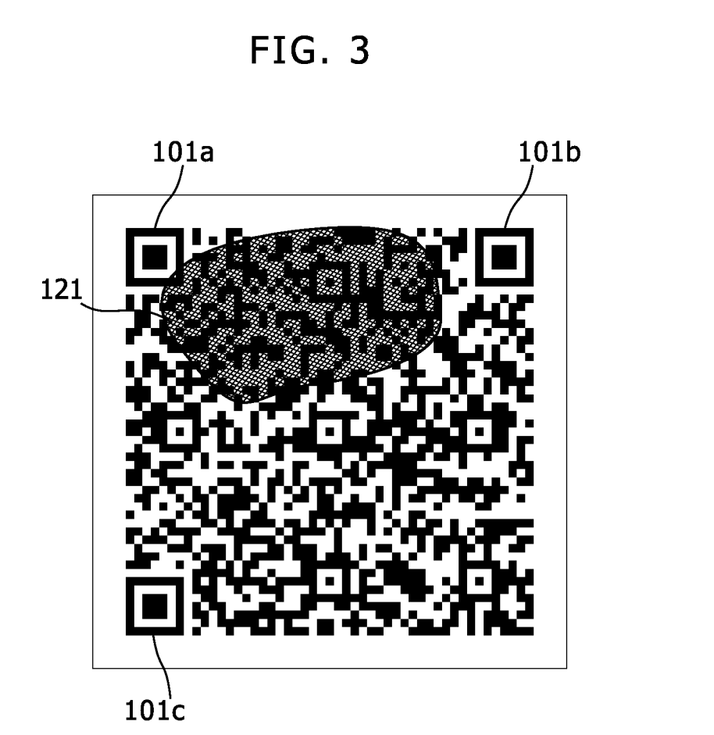
FIG. 3 shows a diagram that indicates a damaged 2D code.
Figure 4:
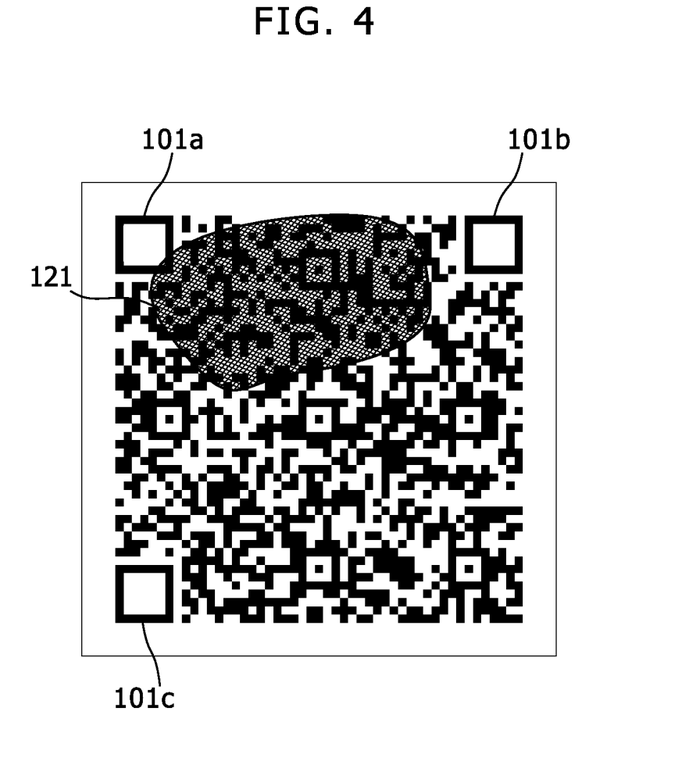
FIG. 4 shows a diagram that indicates an example of invalidation of a position detection pattern in the 2D code shown in FIG. 3.
Figure 5:
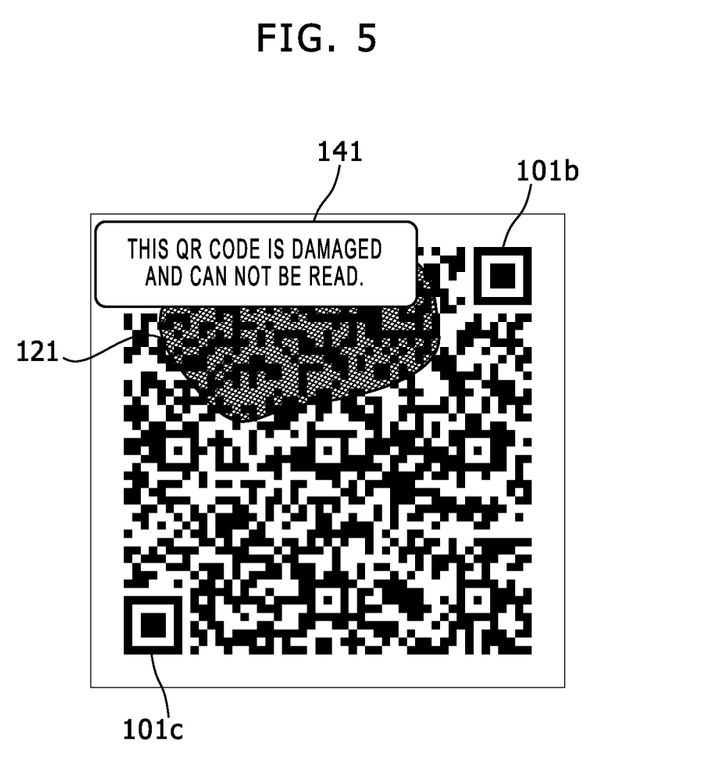
FIG. 5 shows a diagram that indicates another example of invalidation of a position detection pattern in the 2D code shown in FIG. 3.

FIG. 3 shows a diagram that indicates a damaged 2D code. FIG. 4 shows a diagram that indicates an example of invalidation of a position detection pattern in the 2D code shown in FIG. 3. FIG. 5 shows a diagram that indicates another example of invalidation of a position detection pattern in the 2D code shown in FIG. 3.

For example, as shown in FIG. 3, a stain 121 adheres and damages a 2D code (here, a QR code (registered trademark)).

In such cases, as shown in FIG. 4 for example, the invalidation processing unit 14 removes a part or all of the position detection patterns 101a to 101c (e.g. a part shown in FIG. 4) of the 2D code in the document image in order to invalidate the position detection patterns 101a to 101c of the 2D code.

Further, the invalidation processing unit may cover a part or all of the position detection patterns 101a to 101c of the 2D code with a message image 141 in order to invalidate the position detection pattern of the 2D code.

For example, the message image 141 includes a message text that shows it to a user that this 2D code can not be decoded. Further, in FIG. 5, one position detection pattern 101a is invalidated with the message image 141. Alternatively, plural position detection patterns may be covered with message images.

Contrarily, if no 2D codes were detected in the document image in Step S2 or if it was determined that the 2D code was successfully decoded in Step S4, then in Step S5 the invalidation is not performed of the position detection patterns 101a to 101c.

If the damaged 2D code was detected but the decoding of it was failed, then after invalidating the 2D code in the aforementioned manner, the image processing unit 15 performs predetermined image processing for the document image (in Step S6).

The output processing unit 16 causes the printing device 4 to perform printing of the document image on the basis of image data of the document image after the aforementioned processes (in Step S7).

In the aforementioned Embodiment 1, the 2D code detecting unit 12 detects a 2D code in a document image, and the 2D code decoding unit 13 tries to decode the detected 2D code. If the 2D code decoding unit 13 failed to decode the 2D code, the invalidation processing unit 14 performs invalidation of the 2D code so as to make this 2D code undetectable by the 2D code detecting unit 12.

Therefore, when a 2D code is detected but can not be decoded properly due to damage of the 2D code, the 2D code will not be detected from a printing matter on which the document image is printed, and consequently, inconvenience due to the 2D code is not caused to a user who handles the printing matter.

When damage of a 2D code is getting worse, data errors increases in the 2D code, and consequently the 2D code is decoded to data different from original data (i.e. correct data). In the aforementioned manner, the 2D code is invalidated before reaching such a situation, and therefore, the possibility is reduced that the 2D code is decoded to data different from original data due to damage of the 2D code.

Embodiment 2

Figure 6:
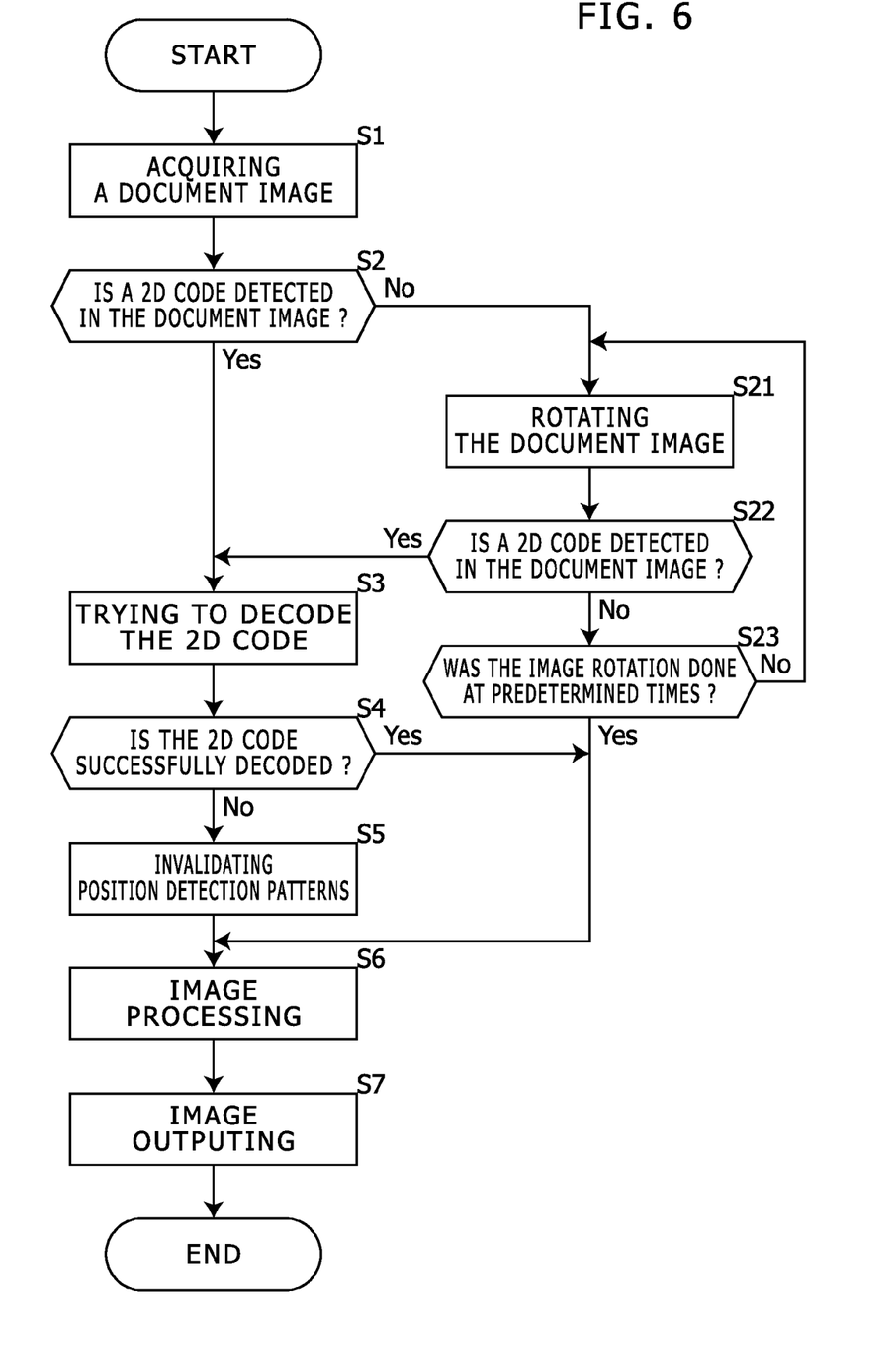
FIG. 6 shows a flowchart which explains a behavior of the image processing apparatus according to Embodiment 2.
Figure 7A:
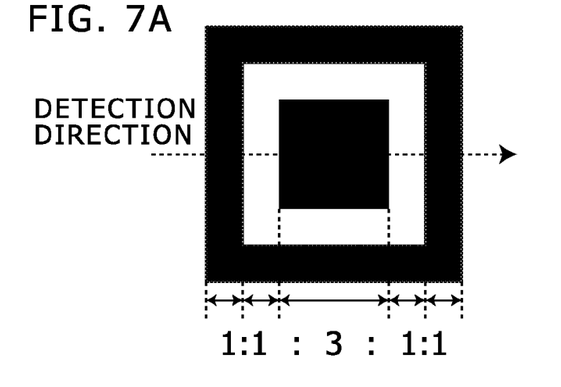
FIGS. 7A to 7C show diagrams that explain detection of a position detection pattern in Embodiment 2.
Figure 7B:
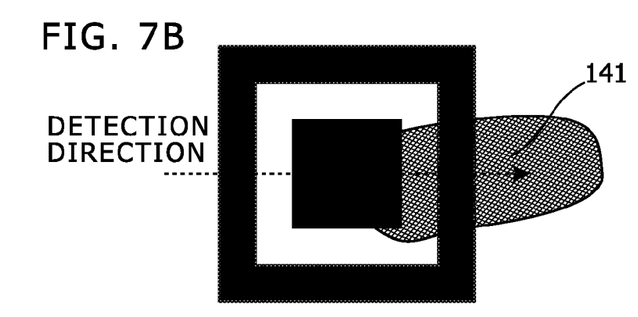
Figure 7C:
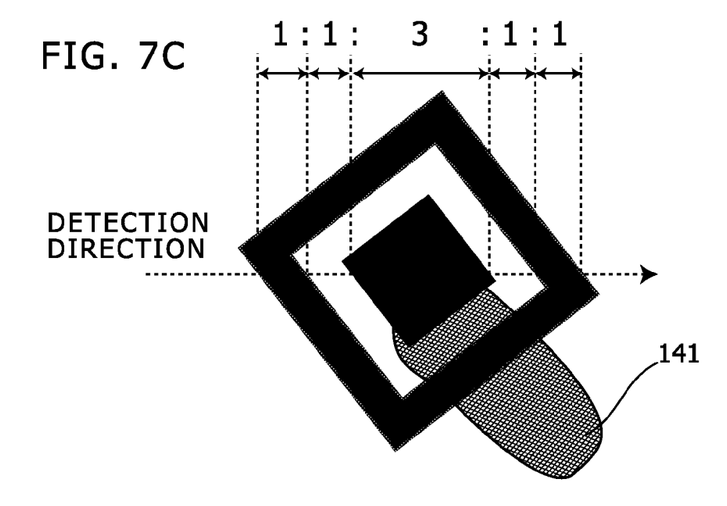

FIG. 6 shows a flowchart which explains a behavior of the image processing apparatus according to Embodiment 2. FIGS. 7A to 7C show diagrams that explain detection of a position detection pattern in Embodiment 2. The image processing apparatus according to Embodiment 2 has the same basic configuration as that in Embodiment 1, but operates in the following manner.

In the image processing apparatus according to Embodiment 2, the 2D code detecting unit 12 tries to detect the position detection pattern of the 2D code along a predetermined detection direction (e.g. the primary scanning direction of the document image) in the document image. As shown in FIG. 7A for example, if an area is detected that includes light-and-shade sections in which high density parts and low density parts are alternately continued along the detection direction has the ratio 1:1:3:1:1, then this area is detected as a position detection pattern.

As shown in FIG. 7B for example, if a stain 141 adheres on the 2D code along the detection direction and the light-and-shade sections having the predetermined ratio is not detected, then the detection of the position detection pattern in the 2D code is failed.

If the detection of the position detection pattern of the 2D code was failed, the 2D code detecting unit 12 repeatedly (a) rotates the document image by a predetermined angle (e.g. any in a range from 1 degree to 39 degrees) (in Step S21) and (b) tries to detect the position detection pattern of the 2D code along the aforementioned predetermined direction in the document image rotated by a predetermined angle (in Steps S22 and S23).

As shown in FIG. 7C for example, if the light-and-shade sections having the predetermined ratio is detected, then the detection of the position detection pattern in the 2D code is succeeded.

If no position detection patterns are detected until the rotation of the document image is performed at predetermined times, the 2D code detecting unit 12 finally determines that no position detection patterns are not detected in the document image (in Step S23).

It should be noted that other behavior of the image processing apparatus according to Embodiment 2 is the same as that in Embodiment 1 and therefore it is not explained here.

In the aforementioned Embodiment 2, in some cases, even if the 2D code (especially, the position detection pattern) is damaged, the 2D code is detected.

The description has been presented for purposes of illustration and description, and is not intended to be exhaustive or limited.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image processing apparatus, comprising:
    an image scanning device; said image scanning device acquiring a document image;
    a 2D code detecting unit configured to detect a 2D code in said document image;
    a 2D code decoding unit configured to try to decode the detected 2D code;
    an invalidation processing unit configured to perform invalidation of the 2D code so as to make this 2D code undetectable by the 2D code detecting unit if the 2D code decoding unit failed to decode the 2D code;
    a printing device that will print out document image data output by the image processing apparatus and print out said document image with the invalidated 2D code if the invalidation processing unit performed invalidation of the 2D code in the document image
    wherein the 2D code detecting unit is further configured to (a) detect the position detection pattern of the 2D code along a predetermined direction in the document image by detecting an area that includes light and shade sections and determining if the ratio of high density parts and low density parts are in the ratio of 1:1:3:1:1 and (b) if the detection of the position detection pattern of the 2D code is failed, try to detect the position detection pattern of the 2D code along the predetermined direction again in the document image rotated by a predetermined angle.

* * * * *